(12) United States Patent
Becker

(10) Patent No.: US 6,260,911 B1
(45) Date of Patent: Jul. 17, 2001

(54) AIR DUCT FOR COOLING ROTATING TIRES

(76) Inventor: John H. Becker, 14 Eagle's Ct., Cartersville, GA (US) 30120

( * ) Notice: Subject to any disclaimer, the term of this patent is extended or adjusted under 35 U.S.C. 154(b) by 0 days.

(21) Appl. No.: 09/505,068

(22) Filed: Feb. 16, 2000

(51) Int. Cl.[7] .................................................. B60J 1/00
(52) U.S. Cl. ................................. 296/180.2; 296/180.1; 180/903; 188/264 R
(58) Field of Search ........................... 296/180.1, 180.2; 180/903; 188/264 R

(56) References Cited

U.S. PATENT DOCUMENTS

| | | |
|---|---|---|
| 2,700,553 | 1/1955 | Ludwig et al. . |
| 3,341,222 | 9/1967 | Roberts . |
| 3,834,732 | 9/1974 | Schons . |
| 4,205,861 | 6/1980 | Roberts et al. . |
| 4,325,563 | 4/1982 | Brandon et al. . |
| 4,334,694 | 6/1982 | Iwanicki . |
| 4,362,310 | 12/1982 | Goodall . |
| 4,372,570 | 2/1983 | Goodall . |
| 4,377,294 | 3/1983 | Lockwood et al. . |
| 4,436,319 | 3/1984 | Clutter . |
| 4,445,700 | 5/1984 | Schroeder . |
| 4,585,242 | 4/1986 | Sparks . |
| 4,660,846 | 4/1987 | Becker . |
| 4,772,060 * | 9/1988 | Kretschmer ................ 296/180.1 |
| 4,772,299 * | 9/1988 | Bogusz ........................ 296/180.1 |
| 4,810,021 * | 3/1989 | Burst ............................ 296/180.1 |
| 4,838,603 * | 6/1989 | Masoero et al. ............ 296/180.1 |
| 5,018,779 * | 5/1991 | Lund ............................ 296/180.2 |
| 5,042,870 * | 8/1991 | Yura ............................. 296/180.1 |
| 5,100,177 | 3/1992 | Becker . |
| 5,301,996 * | 4/1994 | Theis ........................... 296/180.1 |
| 5,511,847 * | 4/1996 | Weisbarth et al. .......... 296/180.1 |
| 5,555,594 * | 9/1996 | Maddalena ................. 296/180.1 |
| 5,626,185 * | 5/1997 | Gielda et al. ............... 296/180.1 |
| 5,820,203 * | 10/1998 | Morelli et al. .............. 296/180.1 |
| 6,033,010 * | 3/2000 | Preiss .......................... 296/180.1 |

FOREIGN PATENT DOCUMENTS

| | | | |
|---|---|---|---|
| 297829 | 3/1930 | (DE) . | |
| 2025519 | 12/1971 | (DE) . | |
| 2524344 | 9/1976 | (DE) . | |
| 3826081 | 2/1990 | (DE) . | |
| 1575907 | 7/1969 | (FR) . | |
| 7822198 | 7/1978 | (FR) . | |
| 1584453 | 2/1981 | (GB) . | |
| 2144690 | 3/1985 | (GB) . | |
| 2165508 | 4/1986 | (GB) . | |
| 2269142 * | 2/1994 | (GB) ................ | 296/180.1 |
| 473134 | 6/1952 | (IT) . | |
| 0500186 * | 1/1956 | (IT) ................... | 296/180.1 |
| 1553432 | 1/1988 | (SU) . | |

* cited by examiner

Primary Examiner—Joseph D. Pape
Assistant Examiner—Kiran B. Patel
(74) Attorney, Agent, or Firm—Samuels, Gauthier & Stevens

(57) ABSTRACT

An air duct for cooling rotating tires that broadly funnels or directs air up and into the face of an air fender or rotating tire. The air duct comprises a depending wall having an upper and a bottom edge. Formed within the wall is a leading tunnel section in communication with a baffle section, the tunnel section having a discharge end. The tunnel section defines at least one flow path which channel ambient air through the discharge end and into the baffle section where the air is subsequently directed into the face of air fender or rotating tire. The baffle section is defined as being between the discharge end of the tunnel section and the either the leading surfaces of an air fender or where there is no fender, the leading surfaces of the associated tire.

9 Claims, 2 Drawing Sheets

AIR DUCT FOR COOLING ROTATING TIRES

FIELD OF THE INVENTION

The invention relates to a system for cooling rotating tires and associated brake assemblies.

BACKGROUND OF THE INVENTION

As set forth in U.S. Pat. No. 5,460,411, a major problem on the nation's highways in the spray caused by rotating tires of truck-trailer transport and like freight carriers that move a majority of cargo and commodities from one point to another. Initial research was directed to controlling the spray cast from the rotating tires. U.S. Pat. No. 5,460,411 discloses that in addition to controlling the spray, a properly designed fender could additionally cool the tires to ensure a longer life and also cool associated brake assemblies to provide for more effective braking.

Tractor trailers, including the spatial relationship between the wheels and the carriages which they support, assume many configurations. There are dry box trailers (vans) which assume a spatial relationship between the loaded carriage and the rotating tires wherein the loaded carriage may only be three to four inches above the top of the rotating tires. There are flat bed trailers which assume a spatial relationship between a loaded carriage and the rotating tires wherein there is substantial clearance between the underside of the loaded carriage and the top of the rotating tire. There are moving vans (trailers) where typically the tires rotate within a wheel well formed within the carriage of the van or buses. There are also trailers which are, in essence, tanks supported on a carrier for transporting gas, oil, etc. Because of all these various combinations, the invention disclosed in the aforementioned patent has varying degrees of effectiveness. For example, when a fender is installed it may be so closely adjacent to the carriage or other structure of the trailer that the air entering the front of the fender is less than what the fender is designed for. This is particularly true for those tractors which now use a side panel called a fuel tank skirt. The skirt used for aerodynamic reasons causes the tires and associated brake assemblies to overheat because of lack of air. The skirt deflects the air away from the tires. Many companies remove the last section of the skirt to get more air onto the tires.

Accordingly, the present invention is directed to an air duct which in one embodiment displaces a portion of the skirt and broadly funnels or directs air up and into the face of an air fender or rotating tire.

In the preferred embodiment of the invention, the air duct is used in combination with an air fender, such as described in the aforementioned patent.

The air duct comprises a depending wall having an upper edge and a bottom edge. Formed within the wall is a leading tunnel section having a discharge end in communication with a following baffle section. Extending from the upper end of the wall is a tread. The tunnel section defines at least one flow path which channels air into the baffle section. The baffle section is defined as being between the discharge end of the tunnel and either the leading surfaces of an air fender or where there is no air fender, the leading surfaces of the associated tire. Air flows through the tunnel and baffle sections of the air duct and is subsequently directed up and into the face of an air fender or rotating tire.

In a particularly preferred embodiment, the baffle section is defined, in part, by a concave surface which directs the air discharged from the tunnels up and onto the central portion of the leading portion of the fender.

DESCRIPTION OF THE PREFERRED EMBODIMENT(S)

Figure 1:
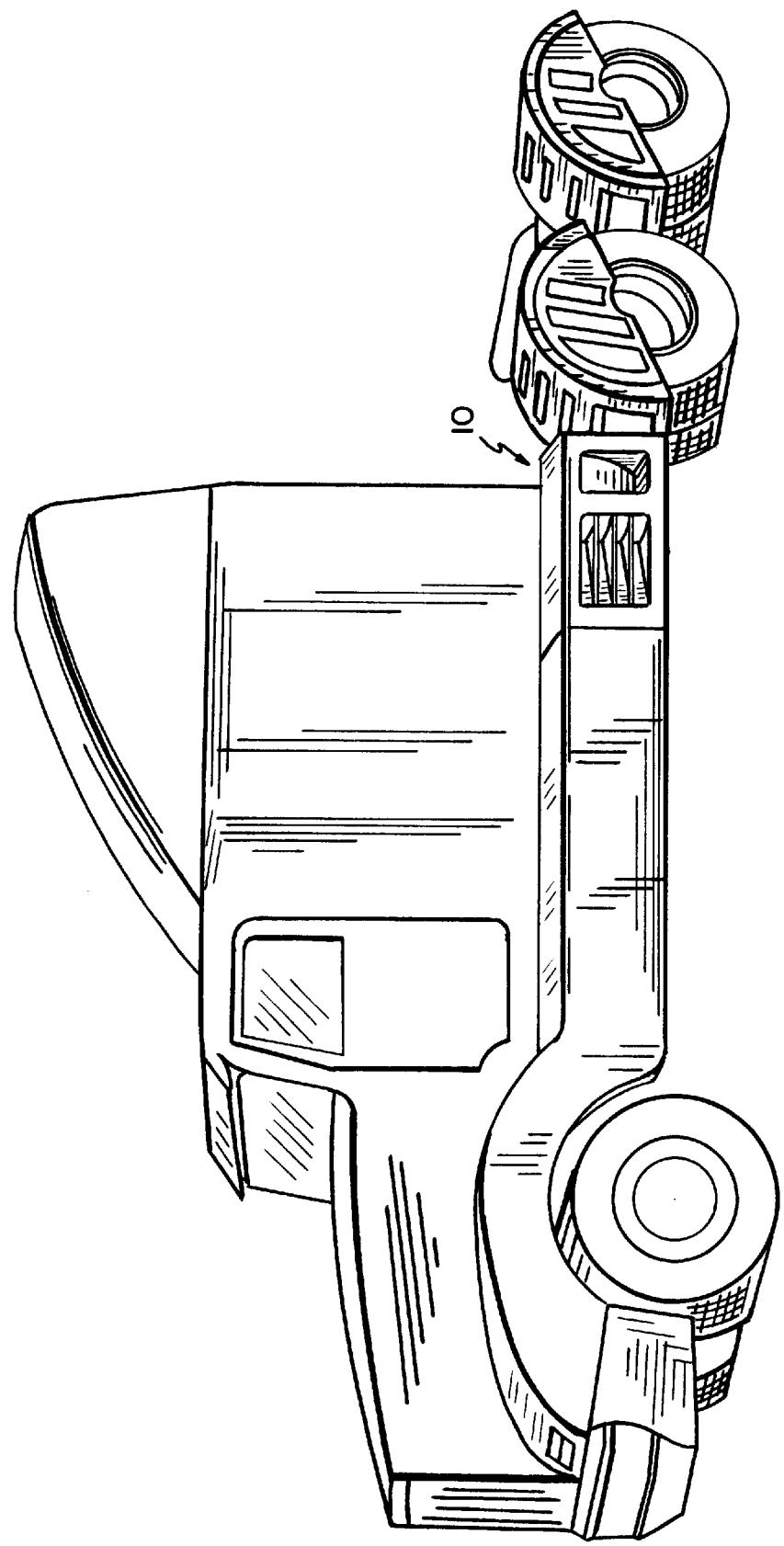
FIG. 1 shows a prior art tractor together with an air duct embodying the invention and an air fender of the prior art.

Referring to FIG. 1, an air duct embodying the invention is shown generally at 10 in line with and upstream of a prior art air fender. The air duct 10 can be secured to the cab of the truck and/or fuel tank skirt, such as by welding and/or bolting.

Figure 2:
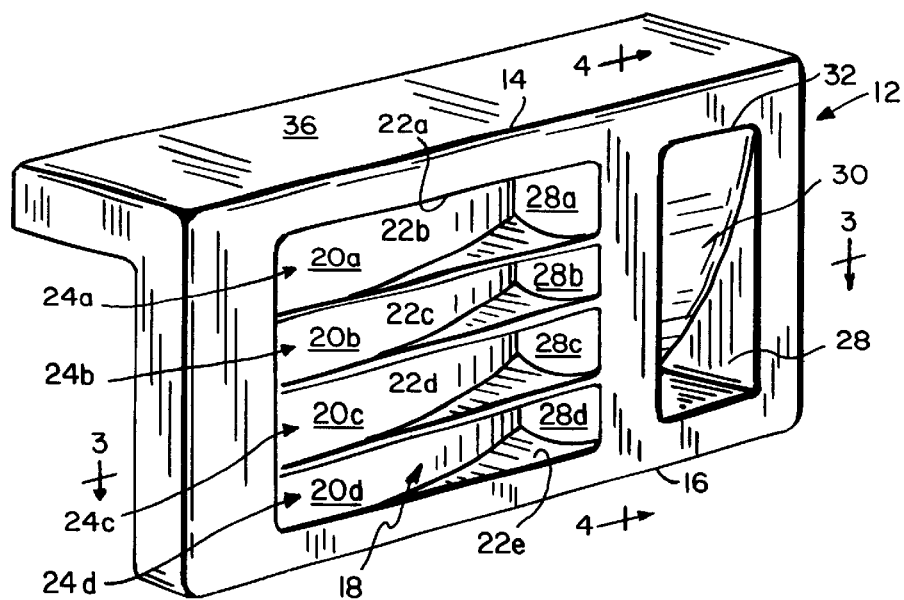
FIG. 2 is a perspective view of the air duct.
Figure 3:
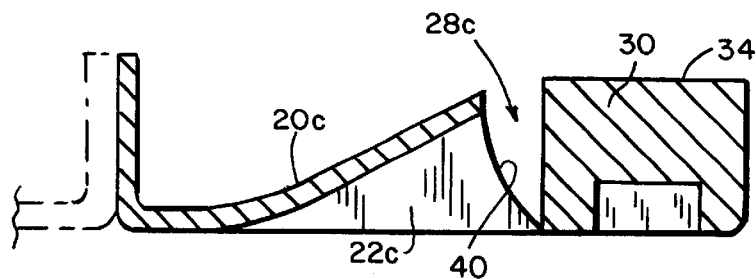
FIG. 3 is a sectional view of FIG. 2 taken along lines 3—3.
Figure 4:
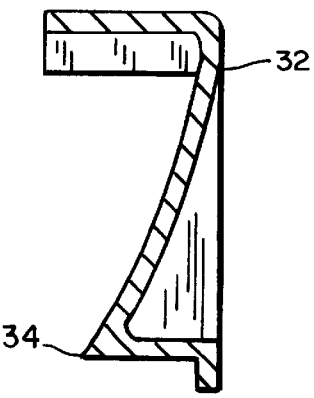
FIG. 4 is a sectional view of FIG. 2 taken along lines 4—4.

Referring to FIGS. 2, 3 and 4, the duct 10 is shown in greater detail and comprises a depending wall 12, upper edge 14, and a bottom edge 16. Formed in the wall 12 is an upstream tunnel section 18 and a baffle section 28.

The tunnel section comprises a plurality of floors 22b, 22c, 22d and 22e and opposed convex walls 20a, 20b, 20c and 20d extending from the floor which define tunnels 24a, 24b and 24c having discharge ends 28a, 28b, 28c and 28d, which discharge air into the baffle section 28.

The baffle section 28 comprises a plate 30. The baffle plate 30 has an upper edge 32 and extends inwardly and downwardly and terminates in a lower edge 34. The baffle plate 30 redirects the air discharged from the tunnel section toward the center of the rotating surfaces of the tire or alternatively, into the leading surfaces of the air fender. A tread 36 extends from the upper edge 14 inwardly to the body of a truck.

Although the invention has been described with reference to its use on the left hand side of a carrier, it is clear that a mirror image air duct for the right hand side of a carrier is within the scope of the invention.

Further, although four tunnels have been described, more than four or less than four tunnels can be used, the geometric configuration of the tunnels can change, e.g. instead of presenting a concave surface, the walls 20 could be flat. Further, the floors 22, although shown as having a convex edge to facilitate the flow of the air into the baffle section, could be straight edged or assume another geometric configuration. Similarly, the baffle plate 30 could be flat and could comprise one or more projections on the surface to increase the turbulence, if desired, of the air flowing to the tire or air fender.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. An air duct for use with rotating tires which comprises:
   a depending wall having an upper edge and a bottom edge;
   an upstream tunnel section formed in the depending wall, the tunnel section comprising a plurality of tunnels, each tunnel comprised of a floor and an opposed wall extending from the floor, the opposed wall having a convex surface and each tunnel having a discharge end; and a baffle section downstream of the tunnel section and in communication with the tunnel section, the baffle section having a baffle plate whereby when air flows through the tunnels and the baffle section, the baffle plate directs air onto a rotating tire.

2. The air duct of claim 1 wherein the tunnels are arrayed in a parallel relationship.

3. The air duct of claim 1 wherein each floor has an edge, the edge characterized in that it is concave.

4. The air duct of claim 1 wherein the baffle plate is convex.

5. An air duct for use with rotating tires which comprises:

a depending wall having an upper edge and a bottom edge;

an upstream tunnel section formed in the depending wall, the tunnel section comprising a floor and an opposed wall extending from the floor which wall and floor define a tunnel having a discharge end;

a baffle section downstream of the tunnel section and in communication with the tunnel section, the baffle section having a baffle plate whereby when air flows through the tunnel and baffle section, the baffle plate directs air onto a rotating tire; and an air fender positioned downstream of the air duct.

6. The air duct of claim 5 comprising a plurality of tunnels.

7. The air duct of claim 5 wherein the tunnels are arrayed in a parallel relationship.

8. The air duct of claim 5 wherein the floors have an edge, the edge characterized in that it is concave.

9. The air duct of claim 5 wherein the baffle plate is convex.

* * * * *